(12) United States Patent
Fackler et al.

(10) Patent No.: US 7,603,218 B2
(45) Date of Patent: Oct. 13, 2009

(54) APPARATUS AND METHOD TO PROVIDE FAILSAFE DECELERATION FOR AN AGRICULTURAL WINDROWER

(75) Inventors: Robert L. Fackler, Ephrata, PA (US); Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/486,704

(22) Filed: Jul. 14, 2006

(65) Prior Publication Data

US 2007/0034745 A1 Feb. 15, 2007

Related U.S. Application Data

(60) Provisional application No. 60/699,943, filed on Jul. 16, 2005, provisional application No. 60/700,050, filed on Jul. 16, 2005.

(51) Int. Cl.
G06F 7/70 (2006.01)
G06F 7/00 (2006.01)

(52) U.S. Cl. .............................. 701/50; 701/36; 701/39; 701/48; 701/52; 701/53; 701/54

(58) Field of Classification Search ................ 188/173, 188/180; 701/1, 62; 318/599, 657; 192/51; 477/112, 125
See application file for complete search history.

(56) References Cited

U.S. PATENT DOCUMENTS

| | | | |
|---|---|---|---|
| 4,281,737 A | 8/1981 | Molzahn | 180/307 |
| 4,398,618 A | 8/1983 | Hansen | 180/273 |
| 4,594,666 A | 6/1986 | Cornell | 364/424.1 |
| 4,648,040 A * | 3/1987 | Cornell et al. | 701/52 |
| 4,663,713 A | 5/1987 | Cornell et al. | 364/424.1 |
| 4,663,714 A | 5/1987 | Cornell et al. | 364/424.1 |
| 5,105,675 A * | 4/1992 | Langford et al. | 74/335 |
| 5,630,489 A * | 5/1997 | Bebernes | 192/219.4 |
| 5,784,883 A * | 7/1998 | Ohkura et al. | 60/327 |
| 5,842,144 A * | 11/1998 | Coutant et al. | 701/62 |
| 6,202,016 B1 | 3/2001 | Stephenson et al. | 701/51 |
| 6,293,363 B1 * | 9/2001 | Rangaswamy et al. | 180/287 |
| 6,309,324 B1 * | 10/2001 | Sawa et al. | 477/125 |
| 6,425,450 B1 | 7/2002 | Lansberry | 180/9.36 |
| 6,655,343 B2 | 12/2003 | Suzuki et al. | 123/198 D |
| 6,901,729 B1 | 6/2005 | Otto et al. | 56/208 |
| 2002/0005302 A1 | 1/2002 | Hidaka | 180/6.24 |
| 2004/0255706 A1 | 12/2004 | Bulgrien | 74/335 |
| 2005/0065689 A1 | 3/2005 | Budde et al. | 701/50 |

* cited by examiner

*Primary Examiner*—Khoi Tran
*Assistant Examiner*—Bhavesh V Amin
(74) *Attorney, Agent, or Firm*—Patrick M. Sheldrake; John William Strader; Michael G. Harms

(57) ABSTRACT

Apparatus and a method for monitoring the performance of control algorithms, and inappropriate operator actions, and for providing failsafe deceleration for a vehicle, particularly an agricultural windrower, wherein the propulsion driveline of the vehicle is controllably and actively decelerated. Inappropriate operator actions can include, but are not limited to, attempted engagement of the park brake when operating in a high speed range. Control algorithm fault conditions can include, for instance, input commands changing at a rate beyond a predetermined threshold, and mismatch between operator control devices such as a FNR lever and a neutral switch.

12 Claims, 25 Drawing Sheets

```
                    if( __45_second_counter_b0_ui > _time_b0_ui2scans_sec_f( 10.000 ) )
                                                           // this tells park brake to immediately engage
                        set_prop_cyl_stuck_bt();
425                 break;

case __HARD:
                    if( __45_second_counter_b0_ui > _time_b0_ui2scans_sec_f( 10.000 ) )
                                                           // this tells park brake to immediately engage
                        set_prop_cyl_stuck_bt();
430                 break;
                }
435             else if( __commanded_disp_in_b12_si > disp_in_b12_si( .125 ) )   // allow 90 seconds
                {
                    if( abs(valid_steeringshaft_in_b12_si()) < disp_in_b12_ui( 0.100 ) ) // signed values---fwd is ascending positively
                        ++__90_second_counter_b0_ui;
                    else
440                     __test_for_sticking_bt = FALSE;

switch( ee_propulsion_drive_mode_nbl )
                    {
                    case __SOFT:
445                     if( __90_second_counter_b0_ui > _time_b0_ui2scans_sec_f( 10.000 ) )
                                                           // this tells park brake to immediately engage
                            set_prop_cyl_stuck_bt();
                        break;

case __MEDIUM:
450                     if( __90_second_counter_b0_ui > _time_b0_ui2scans_sec_f( 10.000 ) )
                                                           // this tells park brake to immediately engage
                            set_prop_cyl_stuck_bt();
455                     break;

case __HARD:
460                     if( __90_second_counter_b0_ui > _time_b0_ui2scans_sec_f( 10.000 ) )
                                                           // this tells park brake to immediately engage
                            set_prop_cyl_stuck_bt();
```

Fig. 11

```
         break;
    }
}

465  if( __commanded_disp_in_b12_si <= disp_in_b12_si(.125) )    //
         __test_for_sticking_bt = TRUE;

470  if( !__test_for_sticking_bt )
         __2_second_counter_b0_ui = __10_second_counter_b0_ui = __45_second_counter_b0_ui = __90_second_counter_b0_ui =0;

break;

475  case _state_DISABLE_DELAY_TIME:

_prop_enable;
     _prop_enabled_bt = TRUE;

480  propfault_main();                    // cfoster11nov2004 propfault_main MUST BE CALLED AFTER _prop_enable;

if( !propfault_state_b0_uc )
485      _propsafe_state_b0_ui = _state_NEUTRAL_CHECK;        // go back to initial state
     else
     {
         if( mfh_is_out_of_neutral_status_xp()        // if he moves MFH out of neutral (beyond the S03 swpoint)
             && ! __mfh_S03_switch_in_neutral         // will go high if have +12VD pwr and mfh comes back to neutral
         {
             __test_for_sticking_bt = TRUE;
490          __2_second_counter_b0_ui = __10_second_counter_b0_ui = __45_second_counter_b0_ui = __90_second_counter_b0_ui =0;
             _propsafe_state_b0_ui = _state_ENABLED;      // go back and continue providing propulsiom power
         }
495      if( !(-- _timer_b0_ui) )                     // if we timed out
             _propsafe_state_b0_ui = _state_NEUTRAL;      // go back to the beginning, dropping propulsiom power
     }
500  break;

case _state_DESTOKE_DELAY_TIME:

_prop_enable;
```

```
505    _prop_enabled_bt = TRUE;

propfault_main();                            // cfoster11nov2004 propfault_main MUST BE CALLED AFTER _prop_enable;

510    if( !(--_timer_b0_ui) )                      // if we timed out
           _propsafe_state_b0_ui = _state_NEUTRAL_CHECK;   // go back to the beginning, dropping propulsiom power break;

515  }

/*······················································/
     static void propsafe_calibrate_main( void )
520  {
     /*
      Description: Main state control for Propulsion Safing Sub-System.
      */
525    static unsigned int __timer_b0_ui;

_prop_disable;
       _prop_enabled_bt = FALSE;                    // default to disabled 530    if( park_brake_status_on_bt_xp )
           _propsafe_state_b0_ui = _state_NEUTRAL_CHECK;

switch( _propsafe_cal_state_b0_ui )
       {
535        case _state_NEUTRAL_CHECK:

if( _propsafe_propcal_begin_b0_uc )
               {
                   _propsafe_propcal_begin_b0_uc = 0;
540                _propsafe_cal_state_b0_ui = _state_NEUTRAL;
               } case _state_NEUTRAL:

545            if( mfh_is_out_of_neutral_status_xp() )    // if he moves MFH out of neutral
                   _propsafe_cal_state_b0_ui = _state_ENABLED;   // go to next state               // stay at initial state
```

```
        break;
550 case _state_ENABLED:
        _prop_enable;
        _prop_enabled_bt = TRUE;
555     if( mfh_is_back_to_neutral_status_xp() )              // if MFH pot R18 says S03 should surely be closed
        {
            _timer_b0_ui= _DISABLE_DELAY_TIME;
            _propsafe_cal_state_b0_ui = _state_DISABLE_DELAY_TIME;   // go to next state
        }
560     break;
    case _state_DISABLE_DELAY_TIME:
565     _prop_enable;
        _prop_enabled_bt = TRUE;
        if( mfh_is_out_of_neutral_status_xp() )               // if he moves MFH out of neutral (beyond the S03 swpoint)
            _propsafe_cal_state_b0_ui = _state_ENABLED;       // go back and continue providing propulsiom power
570     if( !(--_timer_b0_ui) )                               // if we timed out
            _propsafe_cal_state_b0_ui = _state_NEUTRAL;       // go back to the beginning, dropping propulsiom power
575     break;
    }
/****************************************************/
580 bit  propsafe_get_prop_enabled_logic_b_xp( void )
    {
        return( _prop_enabled_bt );                           // FALSE = disabled; TRUE = enabled;
    }
/****************************************************/
585 void propsafe_disable_propulsion( void )
    {
```

Fig. 14

```
    propulsion_ESTOP_state_machine_start();
    propsafe_init();
590 }

/*******************************************/
595 void propsafe_propcal_begin( void )
    {
        _propsafe_propcal_begin_b0_uc = 1;
    }
```

Fig. 15

```
1 /*
    MODULE:      PropFault.rps2005jan011102.c

DESCRIPTION:

5   OPEN ISSUES:

REVISION HISTORY:

10  cfoster2004Nov081402 001 Module created

*/
    // Include Files:
15  #include <reg167.h>
    #include <stdlib.h>
    #include "bin.h"
    #include "can1_out.h"
    #include "can1_recv.h"
20  #include "changes.h"
    #include "disppid.h"
    #include "Engine.h"
    #include "fault_log.h"
    #include "fnr.h"
25  #include "hsd.h"
    #include "iomap_appl.h"
    #include "Park_Brake.h"
    #include "PropSafe.h"
    #include "propulsion.h"
30  #include "propuls_icntrl.h"
    #include "Steering_shaft.h"
    #include "sys_vars.h"
    #include "timer.h"
    #include "warning.h"
35  /*****************
        DEFINITIONS
    *****************/
40  //CONSTANT
    #define _PROPCYL_DECAY_RATE_B8    value_b8_ui( 0.99 )
    #define _PROPICNTRL_DECAY_RATE_B8 value_b8_ui( 0.98 )
```

Fig. 16

```
#define _TSAMP_B9          value_b9_ui( 5.12 )

45 //ENUMERATIONS
   enum _propfault_states
   {
      _state_prop_disabled,    //state 0
      _state_prop_enabled,     //state 1
50    _state2,                 //state 2
      _state3                  //state 3
   };

/***************/
55 // MAPPING
   /***************/

//Map Inputs: Positive Logic...ON = non-zero...OFF = 0.

60 //Map Outputs:

/***************/
   // FUNCITON PROTOYPES
   /***************/
65 unsigned long _propcyl_tracking_monitor( signed int, unsigned long );
   unsigned long _propicntrl_tracking_monitor( signed int, unsigned long );

void propfault_main( void );
   void propfault_init( void );
70
   static void _R18_fault_detect( void );
   static void _R23_fault_detect( void );
   static void _cyl_extents_fault_detect( void );
   static void _mfh_cyl_pos_mismatch( void );
75
   /***************/
   // VARIABLES
   /***************/
   //Global Variables
80 signed char propfault_state_b0_uc;

//Local Variables:
   unsigned int    _propicntrl_decayinteg_b8_ui, _propcyl_decayinteg_b8_ui;
   signed int      _temp_cylpos_err_b12, _temp_i_err_b3;
```

Fig. 17

```
85   unsigned int  _propicntrl_decayinteg_pk_b8_ui = 0;
     unsigned int  _propcyl_decayinteg_pk_b8_ui = 0;

enum _states
90   {
       _state_b0_ui_INIT,
       _state_b0_ui_INTEGRATE
     };
     static unsigned char _state_b0_uc;
95   static signed int _prev_cylpos_in_b12_si;
     static signed int _prev_setpt_in_b12_si;
     static unsigned int _timer_01;

100  /****************************************************/
     void propfault_init( void )
     {
       propfault_state_b0_uc = _state_prop_disabled;
105    //Initialise integrators
       _propcyl_decayinteg_b8_ui = 0;
       _propicntrl_decayinteg_b8_ui = 0;

_state_b0_uc = _state_b0_ui_INIT;
110    _prev_cylpos_in_b12_si = propfault_cylpos_in_b12_si;
       if( mfh_R18_v_b11_ui_w_errors_returned() < 0xfb00 )  // if pot reading not out of range
         _prev_setpt_in_b12_si = ( _fnr_v_b11_si_to_distance_d_b12_si( mfh_R18_v_b11_ui_w_errors_returned() ) );
       else
         _prev_setpt_in_b12_si = 0;
115  }

/****************************************************/
     void propfault_main( void )
120  {
     /*
       Description: Main state control for Propulsion Fault Detection Sub-System.
     */
       static signed int _prior_cylpos_in_b12_si;
125    _R18_fault_detect();
```

Fig. 18

```
        _R23_fault_detect();

130     _cyl_extents_fault_detect();
        _mth_cyl_pos_mismatch();

//Initially disable propulsion
135     propfault_state_b0_uc = _state_prop_disabled;

//evalutate performance of control loops using tracking monitor
        if
140     //Set point is >= 0 and cylinder position is <= set point position and cylinder position is >= to 0
        (
            propfault_setpt_in_b12_si >= disp_in_b12_si( 0.000 )
            && propfault_cylpos_in_b12_si <= propfault_setpt_in_b12_si
            && propfault_cylpos_in_b12_si >= disp_in_b12_si( 0.000 )
        )
145     || //Set point is < 0 and cylinder position is > set point position and cylinder position is <= to 0
        (
            propfault_setpt_in_b12_si < disp_in_b12_si( 0.000 )
            && propfault_cylpos_in_b12_si > propfault_setpt_in_b12_si
150     && propfault_cylpos_in_b12_si < disp_in_b12_si( 0.000 )
        )
        )
        _state_b0_uc = _state_b0_ui_INIT;

155     switch( _state_b0_uc )
        {
        case _state_b0_ui_INIT:
            _propcyl_decayinteg_b8_ui = 0;

160     if
        (
            //Cylinder position is on the same side as the setpoint position and the cylinder position exceeds the setpoint
            (
                propfault_setpt_in_b12_si > disp_in_b12_si( 0.000 )
165         && propfault_setpt_in_b12_si > propfault_setpt_in_b12_si
            )
            ||
            (
```

*Fig. 19*

```
                propfault_setpt_in_b12_si < disp_in_b12_si( 0.000 )
             && propfault_cylpos_in_b12_si < propfault_setpt_in_b12_si
170
          ) //Cylinder position is on the opposite side of the set point position
          (
                propfault_setpt_in_b12_si > disp_in_b12_si( 0.000 )
175          && propfault_cylpos_in_b12_si < disp_in_b12_si( 0.000 )
          )
          ||
          (
                propfault_setpt_in_b12_si < disp_in_b12_si( 0.000 )
180          && propfault_cylpos_in_b12_si > disp_in_b12_si( 0.000 )
          )
       )
       {
          _prior_cylpos_in_b12_si = propfault_cylpos_in_b12_si;           //update the current cylinder position...needs to be transi
185       _state_b0_uc = _state_b0_ui_INTEGRATE;                          //next state
       }
       break;

case _state_b0_ui_INTEGRATE:
190    if( abs(propfault_cylpos_in_b12_si) > abs(_prior_cylpos_in_b12_si) )    //compute performance index of disppid.c
       {
          _propcyl_decayinteg_b8_ui
195          = _propcyl_tracking_monitor
             (
                abs(propfault_cylpos_in_b12_si) - abs(_prior_cylpos_in_b12_si),
                _propcyl_decayinteg_b8_ui
             );
       }
       else
       {
          _propcyl_decayinteg_b8_ui                                       //compute performance index of disppid.c
200          = _propcyl_tracking_monitor
             (
                0,
205             _propcyl_decayinteg_b8_ui
             );
       }
       _prior_cylpos_in_b12_si = propfault_cylpos_in_b12_si;              //update the current cylinder position
210    break;
   }
```

Fig. 20

```
        _propicntrl_decayinteg_b8_ui = _propicntrl_tracking_monitor(propfault_i_err_b3, _propicntrl_decayinteg_b8_ui); //compute performance i //decide whether or not cylinder position control still tracking sufficiently well
        if( ( _propcyl_decayinteg_b8_ui < value_b8_ui( 5.500 ) )
215       && ( _propicntrl_decayinteg_b8_ui < value_b8_ui( 62.500 ) ) )
        {
            propfault_state_b0_uc = _state_prop_enabled;
        }
        else
        {
220         propsafe_disable_propulsion();              //Disable Propulsion System....Cut power to the Supply Rails!!!

if( _propcyl_decayinteg_b8_ui >= value_b8_ui( 5.500 ) )
                fault_log_add_fault( _F434_03 );        //Position Tracking exceeded limit
            else
225             fault_log_add_fault( _F433_03 );        //Current Tracking exceeded limit
        }
    }

230 /*****************************************************/
    unsigned long _propcyl_tracking_monitor(signed int __pcylpos_error_b12, unsigned long __old_pcyl_integ_b8)
    {
    /*
235    This function calculates an exponentially decaying integrator of absolute cylinder position tracking errors
    */
        unsigned long _pcyl_integ_b8;

_pcyl_integ_b8 = (unsigned long)(abs(__pcylpos_error_b12)>>4) + (unsigned long)((_PROPCYL_DECAY_RATE_B8* __old_pcyl_integ_
240     if( _pcyl_integ_b8 > _propcyl_decayinteg_pk_b8_ui )
            _propcyl_decayinteg_pk_b8_ui = _pcyl_integ_b8;

return(_pcyl_integ_b8);
245 }

/*****************************************************/
    unsigned long _propicntrl_tracking_monitor(signed int __pi_error_b3, unsigned long __old_picntrl_integ_b8)
250 {
    /*
        This function calculates an exponentially decaying integrator of absolute valve current tracking errors
```

Fig. 21

```
                                                                                                               */
          unsigned long __picntrl_integ_b8;

255       __picntrl_integ_b8 = (unsigned long)(abs(__pi_error_b3)>>4) + (unsigned long)((_PROPICNTRL_DECAY_RATE_B8* _old_picntrl_integ if( __picntrl_integ_b8 > _propicntrl_decayinteg_pk_b8_ui )
            _propicntrl_decayinteg_pk_b8_ui = __picntrl_integ_b8;

260       return(__picntrl_integ_b8);
        }

265     /*******************************************************************/
        static void _R18_fault_detect( void )
        {
        /*
         Description:  Check for rapid transition of R18 signal that would cause vehicle acceleration
270      Assume the FNR can move from full forward to Neutral in 125ms...dv/dt ~= 1.5/0.125 = 12V/sec = 120mV/10ms
         Qualify this and ignore fast decel's
        */
        signed int __setpt_in_b12_si;

275       if( mfh_R18_v_b11_ui_w_errors_returned() < 0xfb00 )              // if pot reading not out of range
            __setpt_in_b12_si = ( _fnr_v_b11_si_to_distance_d_b12_si( mfh_R18_v_b11_ui_w_errors_returned() ) );
          else
            return;

280       if( __setpt_in_b12_si > disp_in_b12_si( 0.000 ) )                // if going in forward
          {
            if
            (
              abs( __setpt_in_b12_si - _prev_setpt_in_b12_si )
285           > disp_in_b12_si( 1.000 )
            )
            {
              fault_log_add_fault( _F432_03 );                             //MFH forward velocity exceeded limit
              propulsion_ESTOP_state_machine_start();
290         }
          }
          else if( __setpt_in_b12_si < disp_in_b12_si( 0.000 ) )           // else if going in reverse
          {
            if
```

Fig. 22

```
295         (
              abs( __setpt_in_b12_si - _prev_setpt_in_b12_si )
              > disp_in_b12_si( 0.500 )
            )
300         {
              fault_log_add_fault( _F431_03 );          //MFH reverse velocity exceeded limit
              propulsion_ESTOP_state_machine_start();
            }
            _prev_setpt_in_b12_si = __setpt_in_b12_si;
305       }

/*==========================================================*/
      static void _R23_fault_detect( void )
310   {
      /*
      Description:  Check for rapid transition of R23 signal
      Assume the cylinder can move from full forward to neutral in 1sec...ds/dt ~=2/1 = 2in/sec = .02in/10ms
      */
315       if
          (
              abs(propfault_cylpos_in_b12_si - _prev_cylpos_in_b12_si)
              > disp_in_b12_si( 0.200 )
          )
320       {
              fault_log_add_fault( _F430_03 );  //Propulsion Cylinder Velocity exceeded limit
              propsafe_disable_propulsion();    //Disable Propulsion System...Cut power to the Supply Rails!!!
          }
325       _prev_cylpos_in_b12_si = propfault_cylpos_in_b12_si;
      }

/*==========================================================*/
330   static void _cyl_extents_fault_detect( void )
      {
      /*
      Description:  Check R23 signal stuck at extents
      */
335       if
          (
```

Fig. 23

```
        abs( propfault_setpt_in_b12_si )
         < disp_in_b12_si( 0.100 ) )
340    {
        if( _timer_01 >= _time_b0_ui2scans_sec_f( 0.200 ) )
        {
         if( propfault_cylpos_in_b12_si > disp_in_b12_si( 1.950 ) )
345     {
          fault_log_add_fault( _F429_03 ); //Prop Cylinder stuck at forward extent or moving very slowy from forward extent to neutral
          propsafe_disable_propulsion();   //Disable Propulsion System...Cut power to the Supply Rails!!!
         }
         if( propfault_cylpos_in_b12_si < disp_in_b12_si( -0.950 ) )
350     {
          fault_log_add_fault( _F428_03 ); //Prop Cylinder stuck at reverse extent or moving very slowy from reverse extent to neutral
          propsafe_disable_propulsion();   //Disable Propulsion System...Cut power to the Supply Rails!!!
         }
        }
        else
355     ++_timer_01;
       }
       else
        _timer_01 = 0;
360    }
       /*******************************************************/
       static void _mfh_cyl_pos_mismatch( void )
365    /*
        Description:  If Prop Cylinder( R23A ) is in the forward range and the Ground Speed is set for High Range and the MFH( R18 ) position is
                      the Prop Cylinder( R23A ) position by 0.1", than disable the Park Brake Active Destroke.
        */
370    signed int __setpt_in_b12_si;

if( mfh_R18_v_b11_ui_w_errors_returned() < 0xfb00 )                // if pot reading not out of range
         __setpt_in_b12_si = ( _fnr_v_b11_si_to_distance_d_b12_si( mfh_R18_v_b11_ui_w_errors_returned() ) );
375    else
        set_prop_cyl_too_sluggish_bt();

```
380  (
        propfault_cylpos_in_b12_si > disp_in_b12_si( 0.000 )
     && ( propfault_cylpos_in_b12_si - __setpt_in_b12_si ) > disp_in_b12_si( 0.100 )
     )
     set_prop_cyl_too_sluggish_bt();
  }
```

*Fig. 25*

APPARATUS AND METHOD TO PROVIDE FAILSAFE DECELERATION FOR AN AGRICULTURAL WINDROWER

This application claims the benefit of U.S. Provisional Application Nos. 60/699,943 and 60/700,050, filed Jul. 16, 2005.

TECHNICAL FIELD

The present invention relates to vehicular safeing and, more particularly, to apparatus and a method providing failsafe deceleration for an agricultural windrower.

BACKGROUND OF THE INVENTION

U.S. Provisional Application Nos. 60/699,943 and 60/700,050, filed Jul. 16, 2005, are incorporated herein in their entirety by reference. U.S. Pat. No. 6,901,729 is also incorporated herein in its entirety by reference.

Vehicles, such as, but not limited to, agricultural windrowers, can utilize control algorithms for translating input signals, for instance, from operator controlled input devices such as a forward-neutral-reverse (FNR) lever, also sometimes referred to as a multi-function-handle (MFH), to systems to be controlled thereby, such as the propulsion driveline.

It is therefore desirable to have a capability to monitor the performance of such control algorithms, to ensure that the input commands are being accurately and safely translated into machine operations and movements. It is also desirable to have the capability to determine or sense when a controlled system, such as a propulsion driveline, is no longer tracking a reference input signal sufficiently well. A degradation in the tracking capability can occur for any of several reasons, such as an interrupted or corrupted communication path, such as due to electrical noise and/or damage to a conductive path such as a wiring harness, physical wear or damage, and the like. It is also desirable to have the ability to determine or sense when the controlled system is overshooting or undershooting a system bounds. For instance, a propulsion system may drive a vehicle such as a windrower at a speed greater than a set speed. A system can overshoot (measured system output exceeds the desired output value) or undershoot (measured system output is less than the desired output value), which may indicate that a controller for the output has become unstable.

Still further, at times, an operator may attempt to operate the vehicle in an inappropriate manner, such as by attempting to engage or set the park brake at an inappropriate time, such as when the vehicle is moving at a high speed or within a high-speed range.

When a problem or fault, such as any of the above, or an inappropriate operator action, is detected it is further desirable to have a failsafe method for bringing the vehicle to a halt, such as by actively de-stroking the propulsion system.

SUMMARY OF THE DISCLOSURE

Accordingly, what is disclosed is apparatus and a method for monitoring the performance of control algorithms, and inappropriate operator actions, and for providing failsafe deceleration for a vehicle, particularly an agricultural windrower.

A purpose of the invention is to sense when a controlled system, particularly the propulsion driveline, is subject to a fault condition, such as, but not limited to, no longer tracking a reference input signal sufficiently well, and to responsively automatically provide failsafe deceleration. Causes for this can be instability of the control system or a degradation in performance. Another purpose of the invention used to provide automatic failsafe deceleration responsive to an inappropriate operator action, such as an attempt to engage the park brake when moving at high speed, as illustrated above. Failsafe deceleration according to the invention will include actively controlling the propulsion driveline to go from a propulsion mode to a neutral mode, in a controlled manner.

According to a preferred aspect of the invention, an exponentially decaying integrator is used to monitor tracking errors between propulsion commands inputted utilizing the FNR lever, and execution of the commands by the propulsion driveline. Rates of change of FNR lever command signals outside of a preset range, and FNR neutral switch faults, are also monitored.

Tracking errors are integrated and then multiplied by a time-dependent exponentially decaying function. This gives the algorithm a forgetting type property. That is, the most recent error signals are weighted more heavily than ones further in the past. A threshold can be set on this exponentially decaying integrator to indicate when the controlled system is no longer tracking sufficiently well. When the value of the exponentially decaying integrator exceeds the threshold, appropriate action, namely, active de-stroking of the propulsion driveline to bring it to a neutral condition, is performed to preserve the integrity and safety of the system.

According to another preferred aspect of the invention, another algorithm for monitoring the controller stability, checks bounds. When the system is overshooting (measured system output exceeds the desired output value) or undershooting (measured system output is less than the desired output value) it is checked to make sure that the measured output value isn't at a corresponding saturation limit of the hardware, which would be an indication that the controller has become unstable.

The algorithms of the invention have applicability for the current control and position control loops of a propulsion system of an agricultural windrower. More particularly, in the design and operation of a windrower, and in all other similar equipment, it is important to consider the safety of the operator. Accordingly, the instant invention monitors the position of the propulsion cylinder (a cylinder and spring assembly) of the propulsion driveline relative to the FNR lever position. If there is a fault, the spring is allowed to take the drive shaft or propulsion rod of the propulsion driveline, to which pintel arms movable for stroking and de-stroking hydraulic pumps of the driveline are connected, to neutral, and the park brake is allowed to be applied.

Also, two potentiometers can be affixed or mounted in connection with the Propulsion Cylinder and positioned so that at all times the combined voltage output will equal a predetermined value, here, which is 5 V. If not, it is determined that one of the potentiometers is malfunctioning and requires replacement (dual Hall tracking). The fault detection system can use electrical current error integration, position error integration, and dv/dt thresholding of the FNR and Propulsion Cylinder to identify/evaluate any faults. Additionally, the system can determine if the propulsion cylinder is stuck at either of its extents.

The following formulae are preferably used for integration of current and positional errors:

propulsion cylinder integrator=$\int e^{\alpha(T-t)}*$(position error)dT, with limits of integration 0 to t.

electrical current integrator=$\int e^{\alpha(T-t)}*$(current error)dT, with limits of integration 0 to t.

The integrals are approximated (using integer math) via the following formula in discrete time: integral(k)=error(k)+ [A*integral(k−1)] where, k is the sample time, and 0<A<1=decay rate.

According to another aspect of the invention, the control module can be programmed such that the FNR dv/dt monitoring and fault detection only reacts to faults that would cause rapid acceleration, therefore ignoring rapid deceleration commands. The logic of this is that it is not desirable to prevent the machine from decelerating. However, the control module is programmed such that Propulsion Cylinder dv/dt monitoring reacts to acceleration and deceleration.

As another aspect of the invention, the control module can be programmed such that if the FNR lever is in forward range, and being moved towards neutral, and if the Propulsion Cylinder is lagging behind the commanded position by more than a predetermined threshold, and the driveline is in high range, then a fault condition is determined, e.g., if the machine is sluggish to respond to an operator deceleration command, then the propulsion driveline is actively de-stroked in a controlled manner, to bring the vehicle to zero ground speed.

BRIEF DESCRIPTION OF THE DRAWINGS

The advantages of this invention will be apparent upon consideration of the following detailed disclosure of the invention, especially when taken in conjunction with the accompanying drawings wherein:

FIG. 11 is a listing of code of a computer program incorporating steps of a preferred embodiment of the method of the invention;

FIG. 12 is a continuation of the listing;
FIG. 13 is a continuation of the listing;
FIG. 14 is a continuation of the listing;
FIG. 15 is a continuation of the listing;
FIG. 16 is a continuation of the listing;
FIG. 17 is a continuation of the listing;
FIG. 18 is a continuation of the listing;
FIG. 19 is a continuation of the listing;
FIG. 20 is a continuation of the listing;
FIG. 21 is a continuation of the listing;
FIG. 22 is a continuation of the listing;
FIG. 23 is a continuation of the listing;
FIG. 24 is a continuation of the listing; and
FIG. 25 is a continuation of the listing.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. Still further, in this description, the terms FNR lever, multi-function handle and MFH referred to the same item, and therefore are interchangeable.

Figure 1:
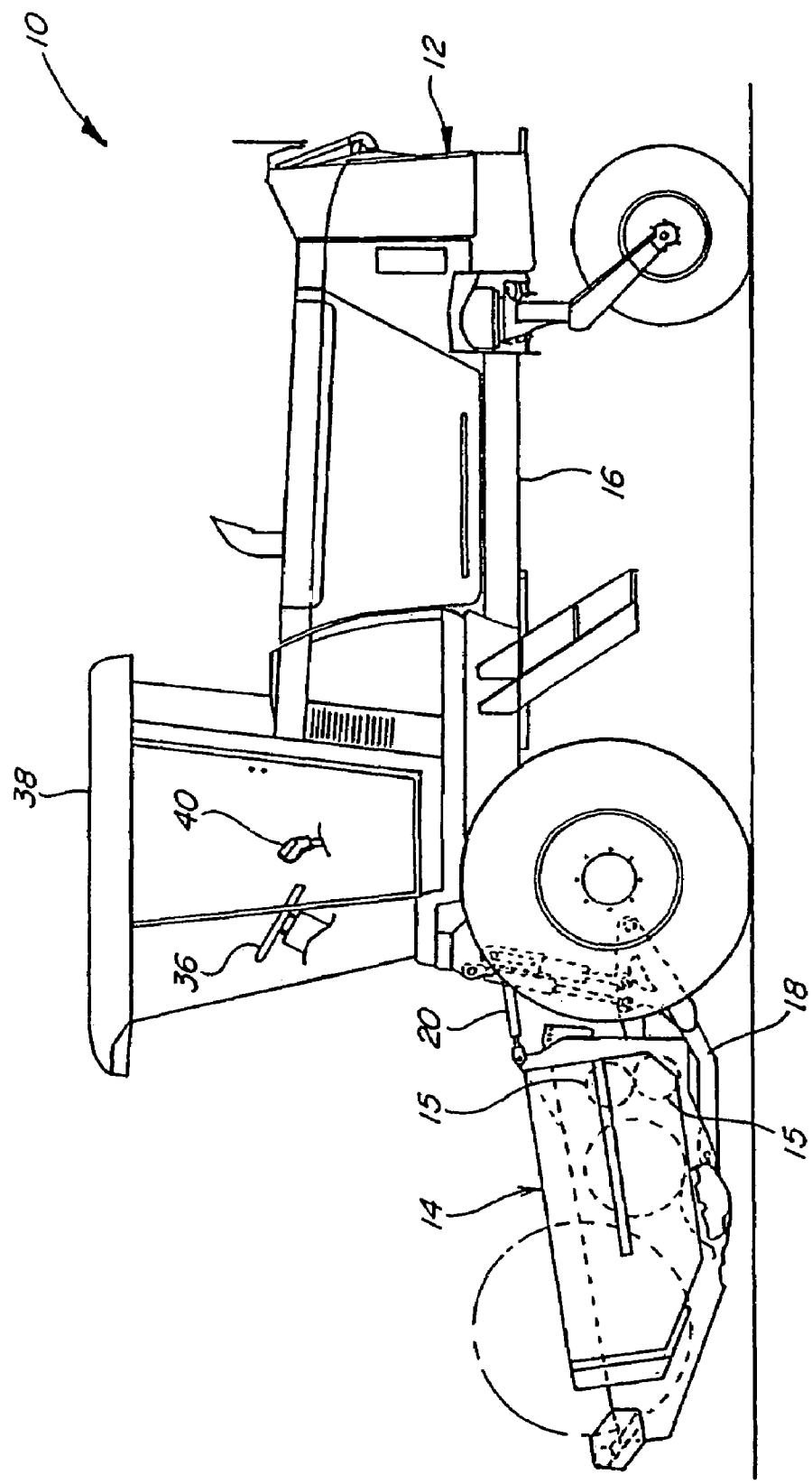
FIG. 1 is a partial side elevational view of a windrower of the type with which the invention may be used, including a header for severing crops from a field, mounted on a front end of the windrower.
Figure 2:
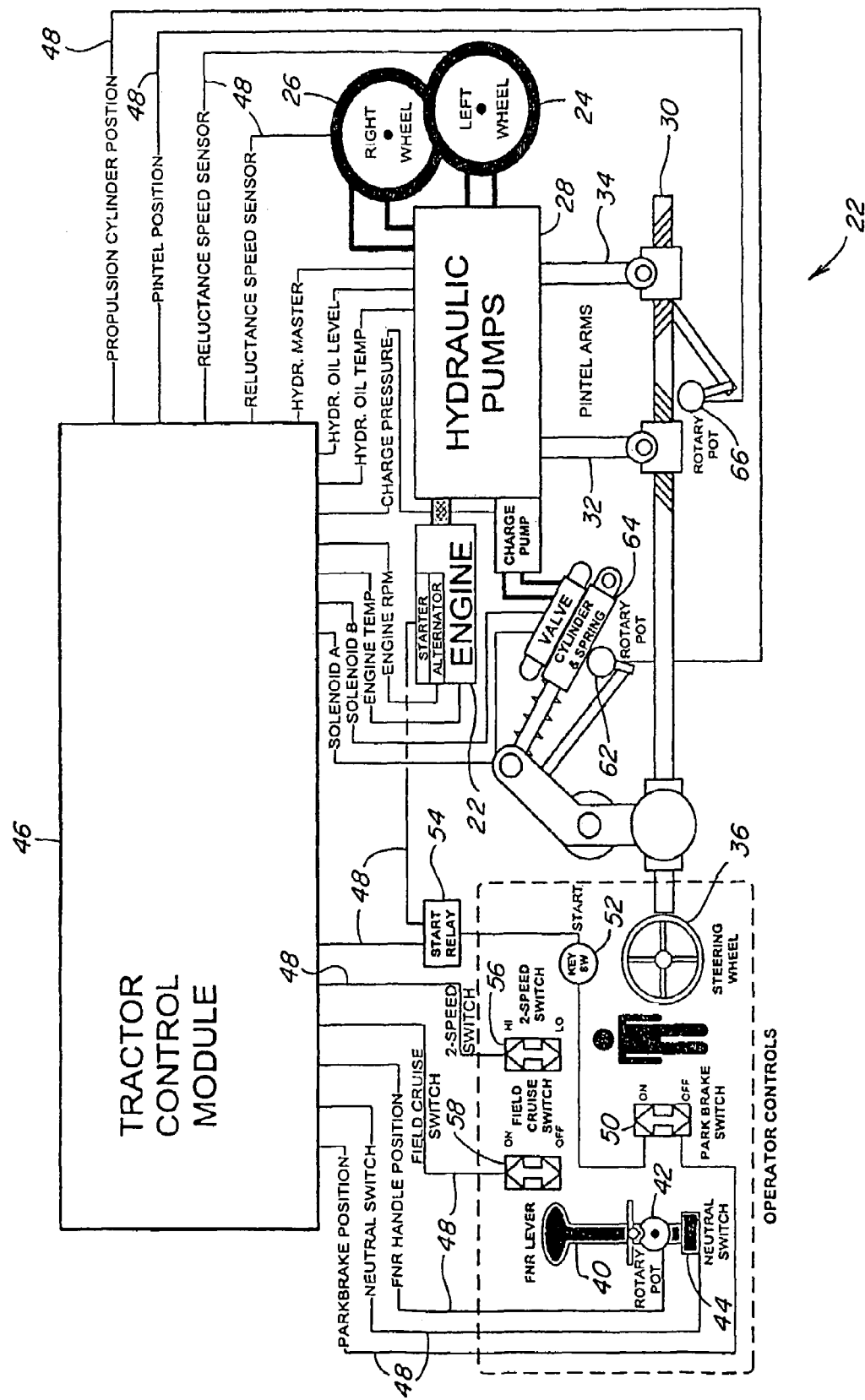
FIG. 2 is a simplified diagrammatic representation of a propulsion driveline of the windrower incorporating aspects of the instant invention.
Figure 3:
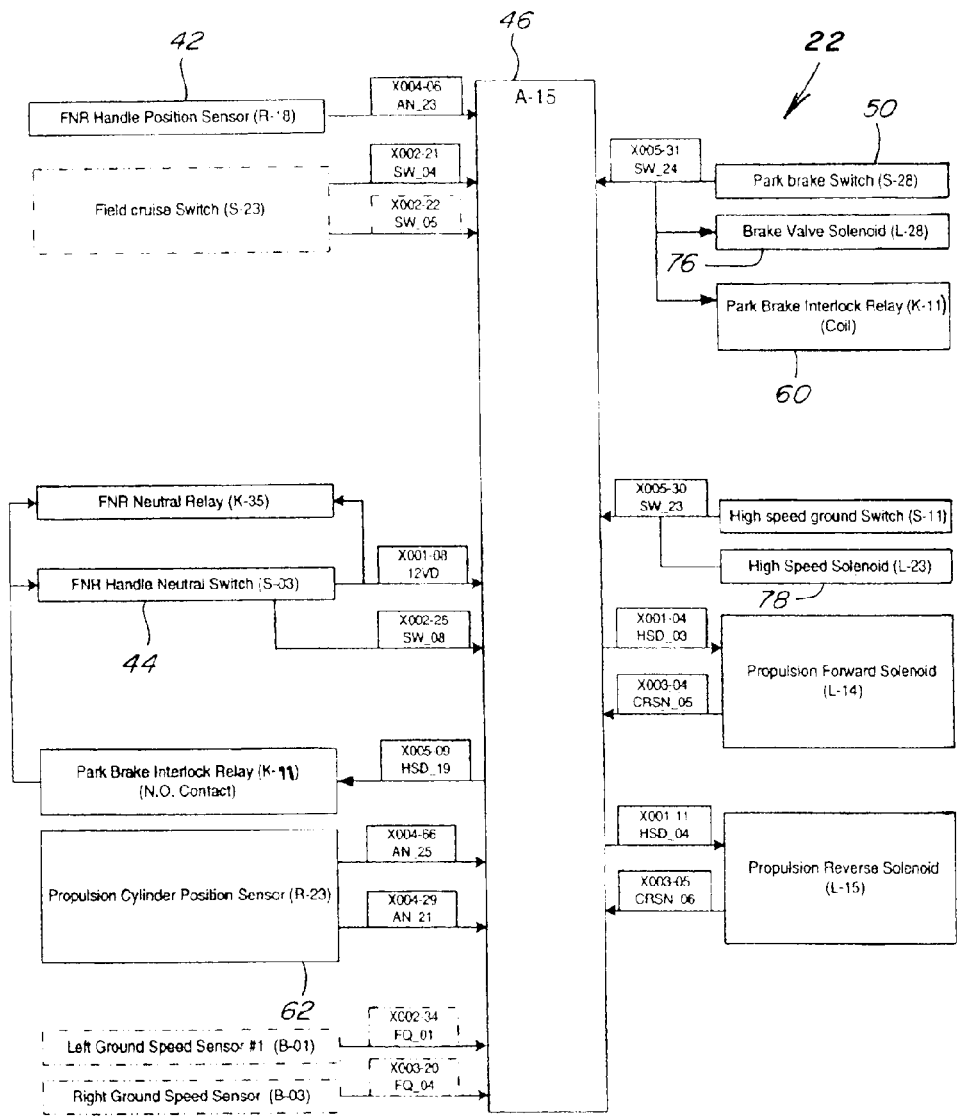
FIG. 3 is a schematic of aspects of circuitry of the propulsion driveline.
Figure 4:
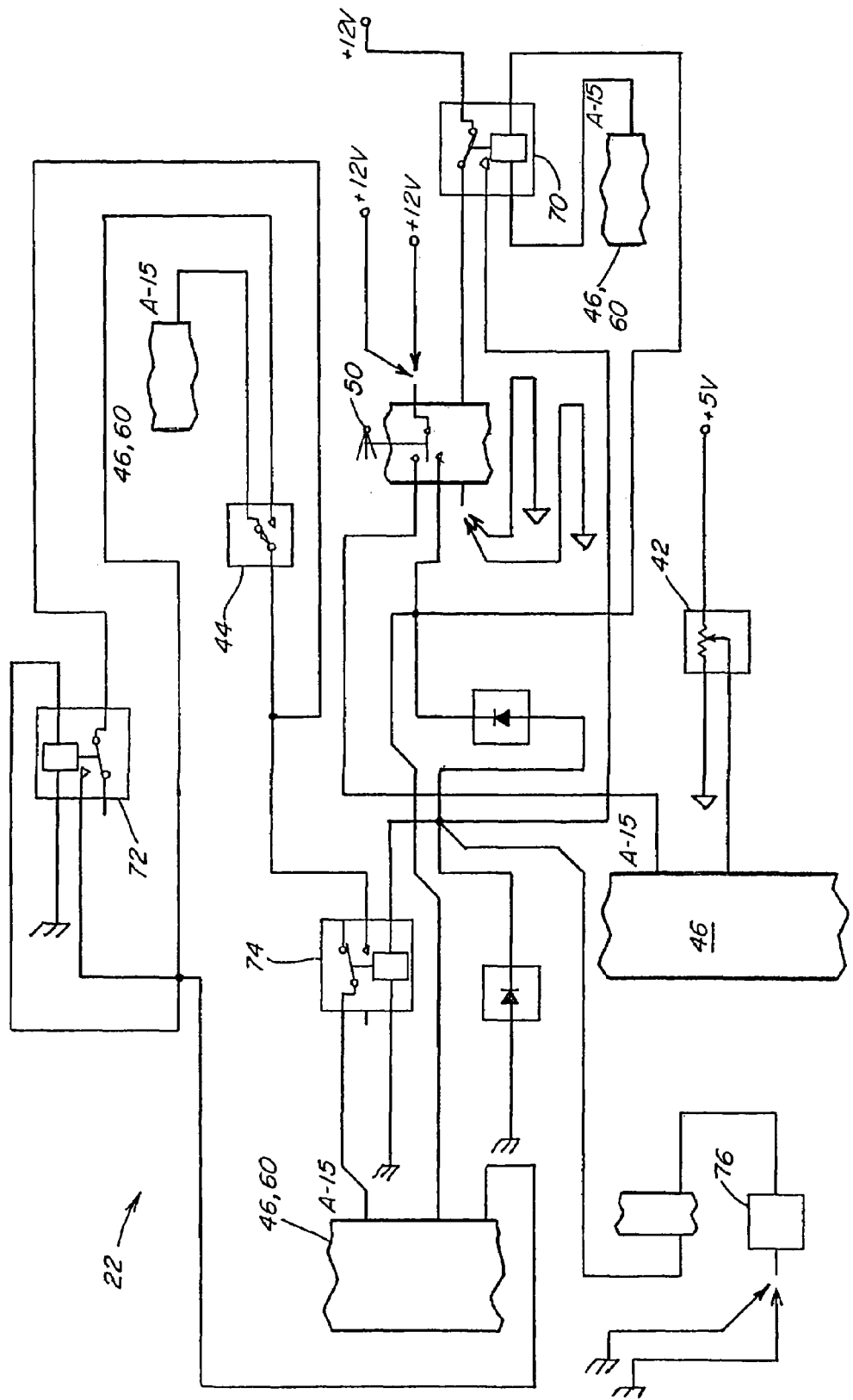
FIG. 4 is another schematic of aspects of circuitry of the propulsion driveline.

FIG. 1 shows a self-propelled windrower 10 incorporating the apparatus and method of the invention; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting (mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20.

One or more cylinders, such as individual lift and flotation cylinders, or a single lift/flotation cylinder, interconnects the lower arm 18 and the frame 16 on each side of the header.

Typical features and operation of a system for controlling the lift and flotation functions for a header, such as header 14 depicted herein, are disclosed in U.S. Pat. No. 6,901,729, incorporated herein by reference.

Referring also to FIGS. 2, 3, 4, 5 and 6, windrower 10 includes a propulsion driveline 22 controllably operable using operator controls for rotatably driving a left wheel 24 and a right wheel 26 for propelling windrower 10 over a ground or other surface. Hydraulic motors (not shown) in connection with each wheel 24 and 26, respectively, are provided with fluid under pressure by hydraulic pumps 28, for driving the wheels. The pumps 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps 28 in the well-known manner. Steering commands are inputted to driveline 22 by an operator via an operator control which is a steering wheel 36 disposed in an operator cab 38 of windrower 10. Steering movements of windrower 10 are effected by rotating respective wheels 24 and 26 at different speeds. Propulsion speed and direction commands are inputted to driveline 22 by an operator via an operator control which is a FNR lever 40 also disposed in cab 38.

FNR lever 40 is configured to operate a suitable sensor or sensors operable for generating varying information or outputs representative of the position of lever 40 when lever 40 is manipulated or moved, including one rotary potentiometer 42 and a neutral switch 44, each of which is connected to a tractor control module 46 via a suitable conductive path or paths 48, which can be, for instance, a wire or wires of a wiring harness, an optical path, a wireless path, or the like. Tractor control module 46 can be provided as a single unit, or two or more control modules connected by a controller area network (CAN). Movements of FNR lever 40 in relation to the neutral position will cause potentiometer 42 to output a varying signal representative of the position of lever 40, which signal comprise a voltage. It is desired for this voltage signal to very precisely indicate the position of lever 40, such that precise control of the forward and rearward movements of windrower 10 can be achieved.

Neutral switch 44 is also mounted and configured such that movements of FNR lever 40 into the neutral position, and out of the neutral position, will cause changes in the operating state of switch 44. Here, forward and rearward movements of FNR lever 40 from a generally straight up neutral position shown, will effect a change of state of switch 44 which will be outputted to control module 46, which will responsively power up the propulsion driveline, control module 46 controlling the propulsion speed of windrower 10 as a function of the voltage output of the potentiometer 42. Similarly, rearward movement of FNR lever 40 from the neutral position will effect a change of state of switch 44 outputted to control module 46 to affect operation of the propulsion driveline in the reverse direction, and the voltage output of the potentiometer 42 will be used to control reverse speed. It is also desired that, when lever 40 is moved into the neutral position, the propulsion system be controlled to positively de-stroke or otherwise transition into a non-propelling state over time, such that abrupt stoppage does not occur.

Other operator controls include a park brake switch 50 also connected to tractor control module 46 via a conductive path 48, and via another conductive path 48 to a key switch 52 and a start relay 54 in connection with a starter of engine 22 and with tractor control module 46. A 2-speed switch 56 is connected to tractor control module 46 via another conductive path 48, as is a field cruise switch 58.

Tractor control module 46 is in connection with a dual rotary potentiometer 62 via conductive paths 48, potentiometer 62 being operable for outputting information representative of the position of a propulsion cylinder 64. Propulsion cylinder 64 is extendable and retractable by solenoids controlled by tractor control module 46, based on the voltage outputs of potentiometer 42, to move propulsion rod 30 longitudinally for changing the stroke of the hydraulic pumps 28 via the angle of the pintel arms 32 and 34, for effecting propulsion of the windrower. A rotary potentiometer 66 is operable for outputting information representative of the position of pintel arm 32 to module 46 via another conductive path 48, providing information representative of differential stroking of pumps 28 to effect steering movements. Information representative of speed of respective wheels 24 and 26 is determined by reluctance speed sensors (FIG. 5) and communicated via conductive paths 48 to module 46. Differences in the speed readings is also indicative of steering movements.

FIGS. 3, 4, 5 and 6 schematically illustrate circuitry of propulsion driveline 22, including those associated primarily with the operator controls, including potentiometer 42; neutral switch 44; control module 46; park brake switch 50; speed switch 56; and additionally, a park brake latch relay 70; a propulsion enable relay 72, also sometimes referred to as a propulsion latching relay; and a propulsion interlock relay 74. Other illustrated elements of propulsion driveline 22 include a park brake interlock relay 60, a brake valve solenoid 76 and a ground speed high solenoid 78.

Figure 5:
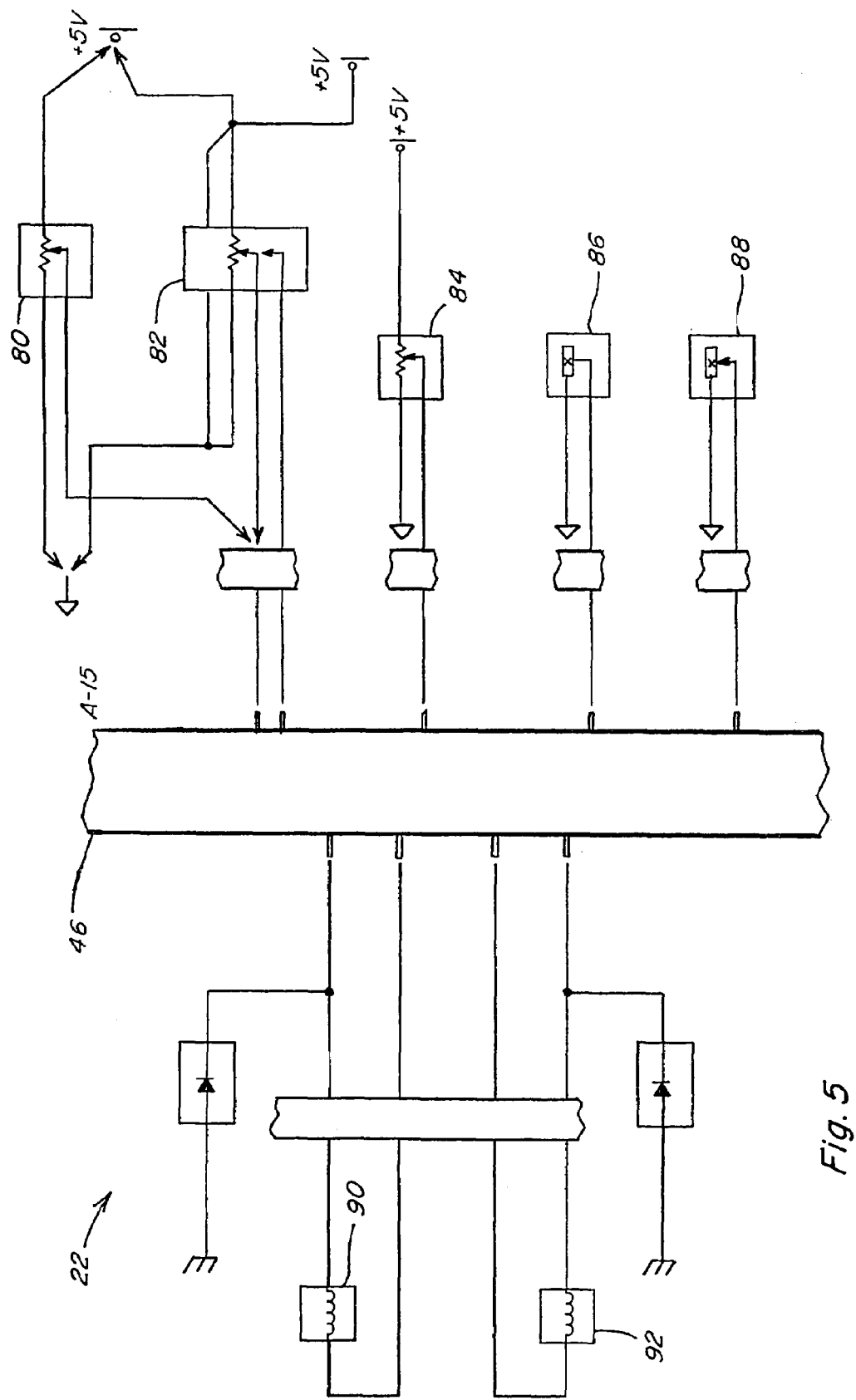
FIG. 5 is another schematic of circuitry of the propulsion driveline.
Figure 6:
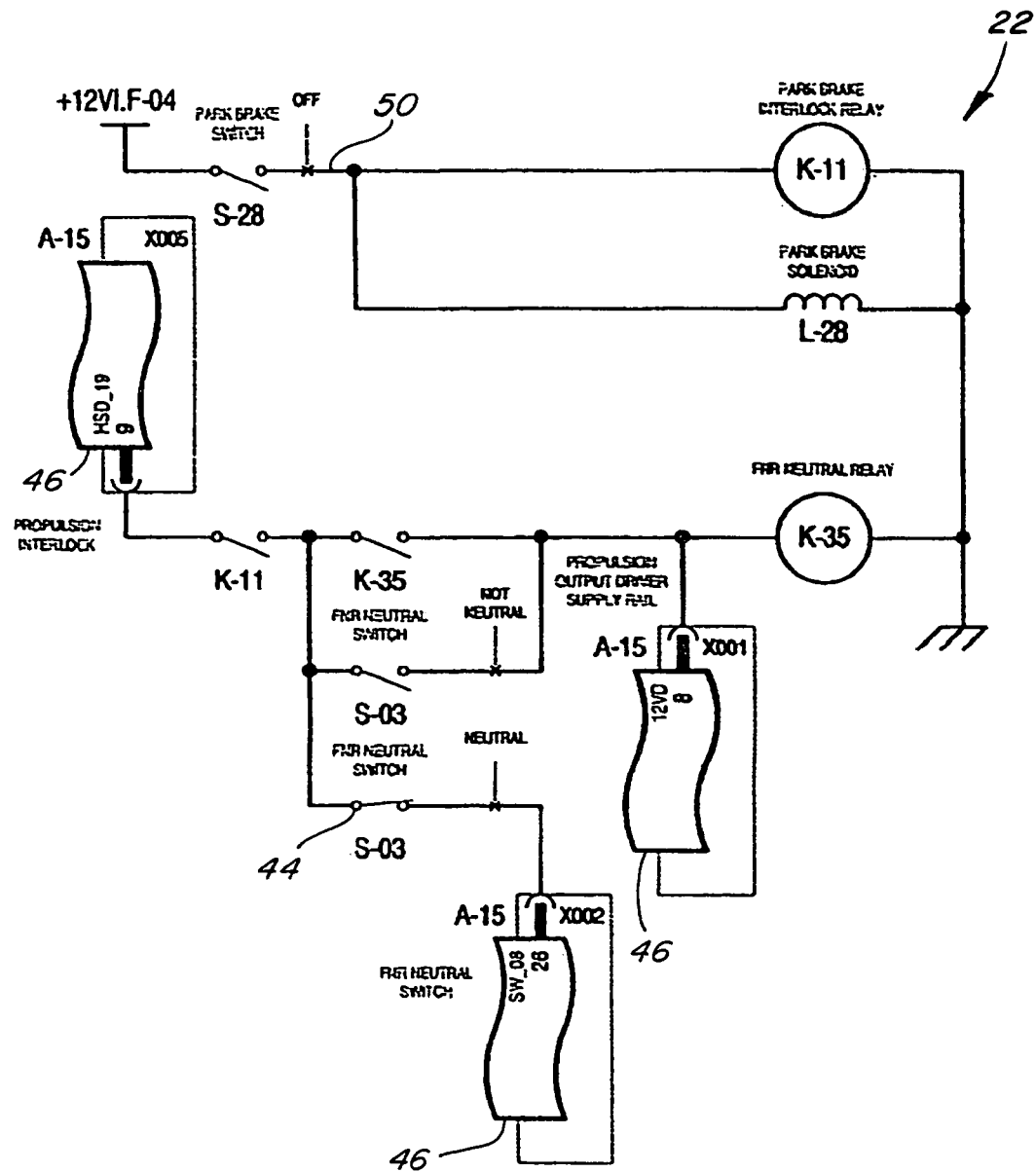
FIG. 6 is still another schematic of aspects of circuitry of the propulsion driveline.

FIG. 5 additionally schematically illustrates other aspects of propulsion driveline 22, including aspects of tractor control module 46 in connection with propulsion cylinder position sensors 80 and 82 which incorporate rotary potentiometers 62 (FIG. 2); a pintel arm position sensor 84 incorporating rotary potentiometer 66 (also FIG. 2); left and right ground speed sensors 86 and 88; a propulsion forward solenoid 90; and a propulsion reverse solenoid 92.

As noted above, the instant invention utilizes control module 46 to monitor the propulsion command inputted thereto by potentiometer 42 indicative of the position of FNR lever 40. Essentially, the output of only one of the potentiometers 62 is required for signaling propulsion commands or inputs, but two are used (dual Hall tracking) and the voltage outputs are continually summed. If the sum does not equal a predetermined value, here 5 V, it is determined that an error in the voltage signal of one or both of the potentiometers is determined. The output of potentiometer 62 is indicative of the position of propulsion cylinder 64 of the propulsion driveline 22. The position of propulsion cylinder 64 (and thus the output of potentiometer 62) should, if normally operating, correspond to or track the inputted command from potentiometer 42, modified by a transfer function, with consideration of normal deviations such as due to hysteresis, time lag in executing the propulsion commands, and the like. dv/dt (changing voltage over time) thresholding of the FNR potentiometer is used to identify/evaluate any faults.

Figure 7:
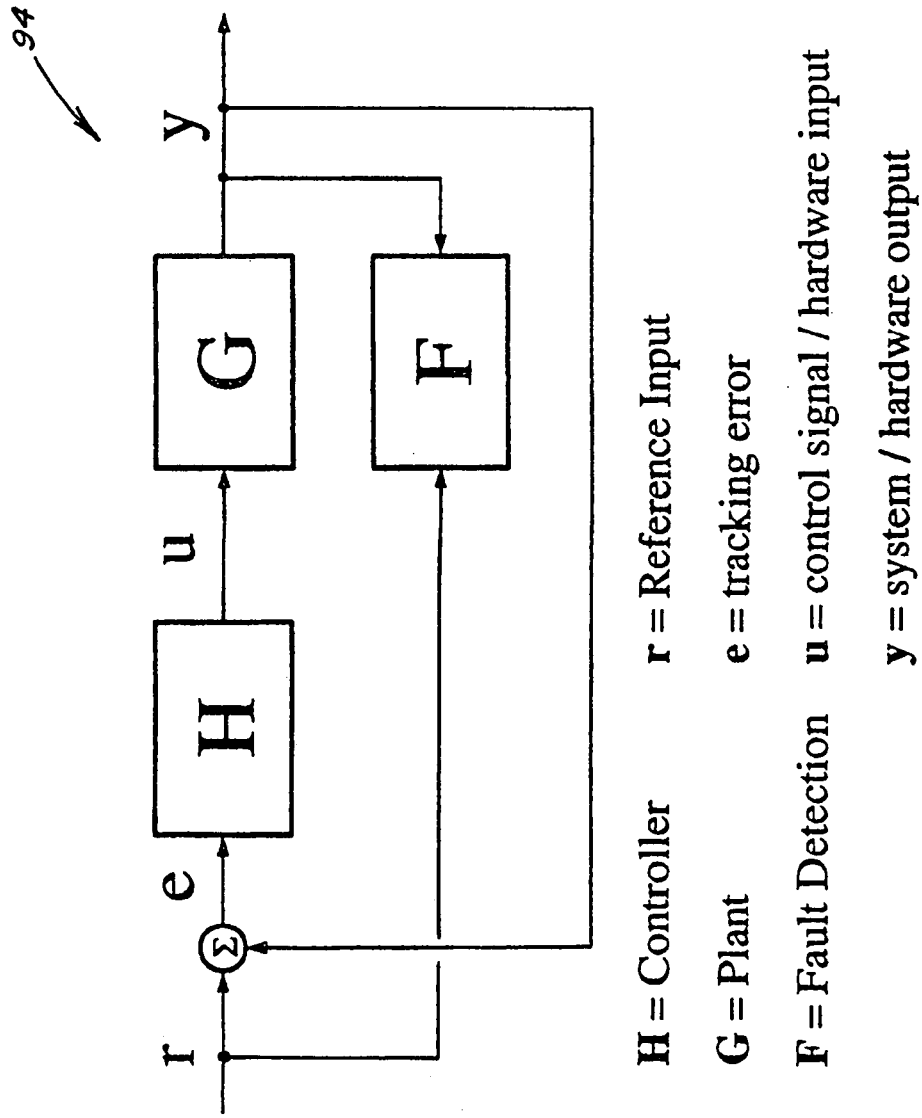
FIG. 7 is a diagram illustrating a control system of the propulsion driveline and fault detection system embodying a preferred method of the instant invention.

FIG. 7 includes a diagram 94 illustrating the flow of operator input commands and hardware outputs utilized in error monitoring and fault detection according to the invention. Essentially, reference input commands r (e.g., voltage inputted through the position of FNR lever 40 by potentiometer 42) is matched with responsive system/hardware outputs y (e.g., voltages outputted by potentiometers 62) to derive tracking errors e by control modules 46 (Controller H). Tracking errors e are processed to determine any faults (Fault Detection F). This is preferably done using the following exponentially decaying integrator, also used for integration of current errors:

propulsion cylinder integrator=$\int e^{a(T-t)}*$(position error)dT, with limits of integration 0 to t.

electrical current integrator=$\int e^{a(T-t)}*$(current error)dT, with limits of integration 0 to t.

The integrals are approximated (using integer math) via the following formula in discrete time: integral(k)=error(k)+ [A*integral(K−1)] where, k is the sample time, and 0<A<1=decay rate to give the algorithm a forgetting type property wherein the most recent error signals are weighted more heavily than ones further in the past. A predetermined threshold is set on this exponentially decaying integrator to indicate when the controlled system is no longer tracking sufficiently well. When the value of the exponentially decaying integrator exceeds the threshold, appropriate action is taken to preserve the integrity and safety of the system, which can include outputting of a fault signal to the operator, an automatic system shutdown, or the like. overshooting (measured system output exceeds the desired output value) or undershooting (measured system output is less than the desired output value) it is checked to make sure that the measured output value isn't at a corresponding saturation limit of the hardware, which would be an indication that the controller has become unstable.

If there is a fault, solenoids A and B (FIG. 2) controlling the valve which directs hydraulic fluid to the chambers of propulsion cylinder 64 are de-energized, to allow the spring associated with propulsion cylinder 64 to take propulsion rod 30 to neutral, thereby de-stroking hydraulic pumps 28, and the park brake is allowed to be applied.

Control module 46 can be programmed such that the FNR dv/dt monitoring and fault detection only reacts to faults that would cause rapid acceleration, therefore ignoring rapid deceleration commands. However, control module 46 can be programmed such that Propulsion Cylinder dv/dt monitoring reacts to acceleration and deceleration.

Control module 46 can additionally be programmed such that if FNR lever 40 is in a forward range, that is, it is moved in the direction for commanding the windrower to move forward, and is being moved towards neutral, and if the Propulsion Cylinder 64 is lagging behind the commanded position by more than a predetermined threshold, and driveline 22 is in high range, then a fault condition is determined, e.g., if the machine is sluggish to respond to an operator deceleration command, then the propulsion driveline is actively de-stroked and park brake is automatically applied.

Figure 8:
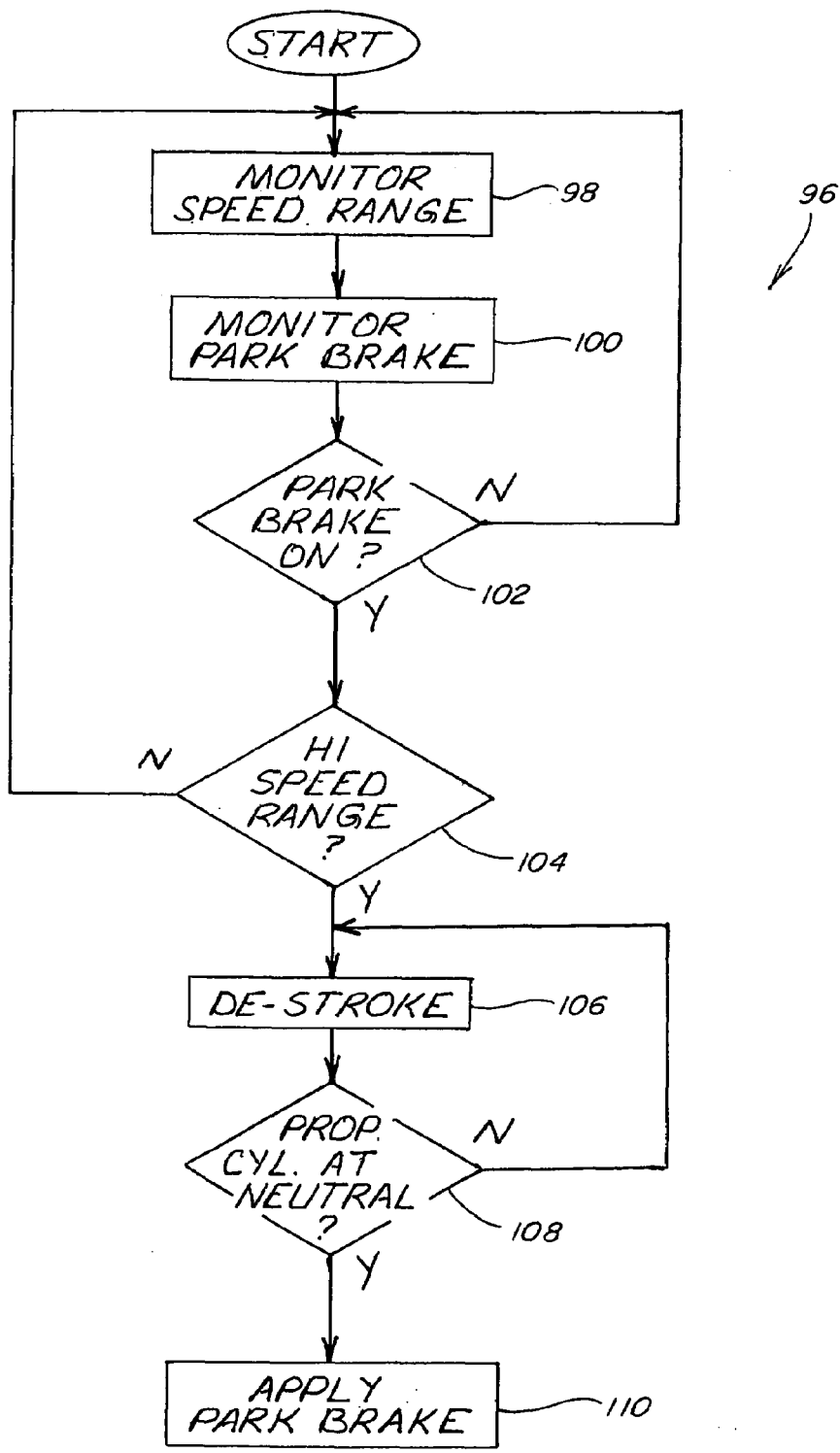
FIG. 8 is a flow diagram illustrating steps including aspects of the invention.
Figure 9:
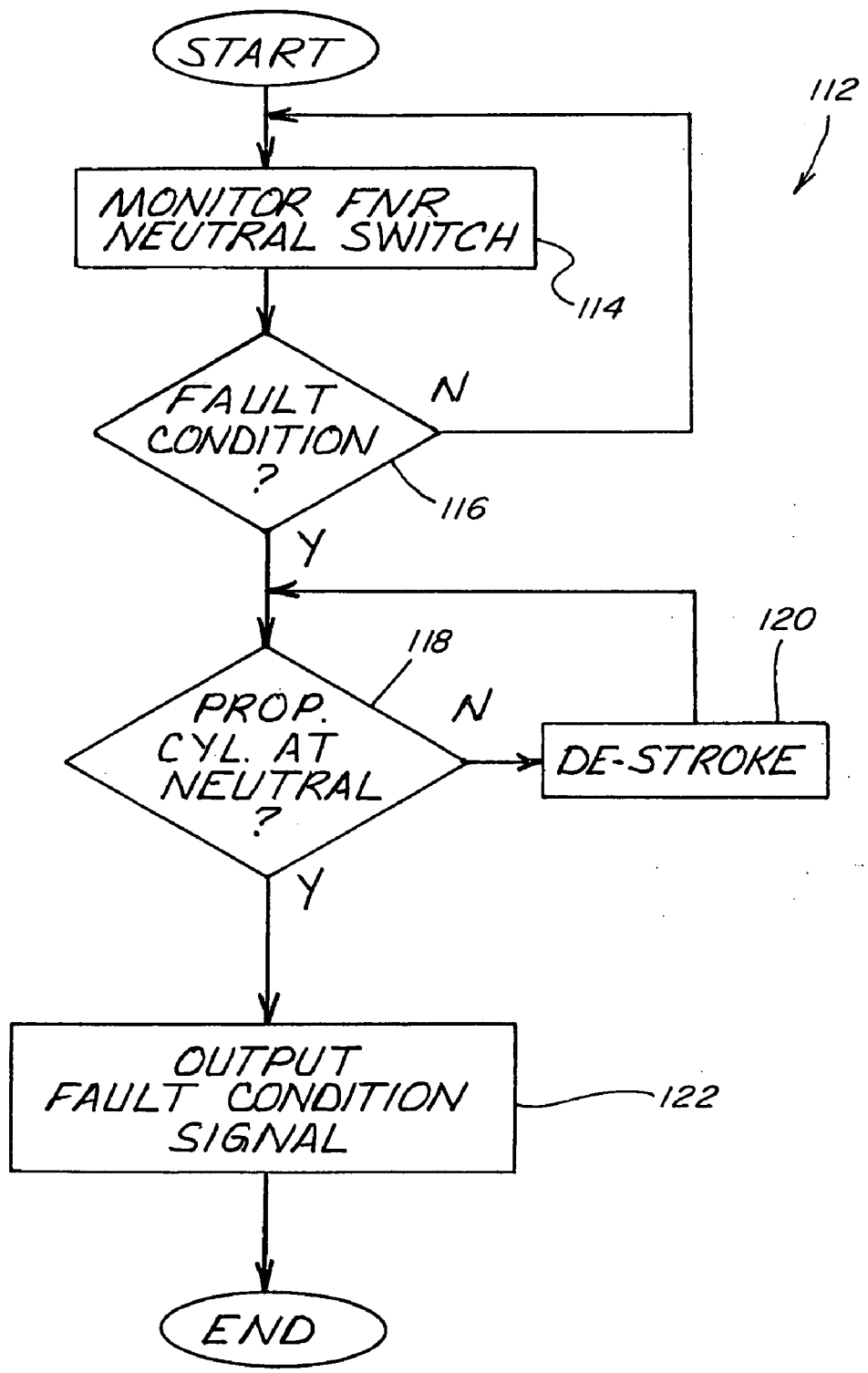
FIG. 9 is a flow diagram illustrating steps including other aspects of the invention.
Figure 10:
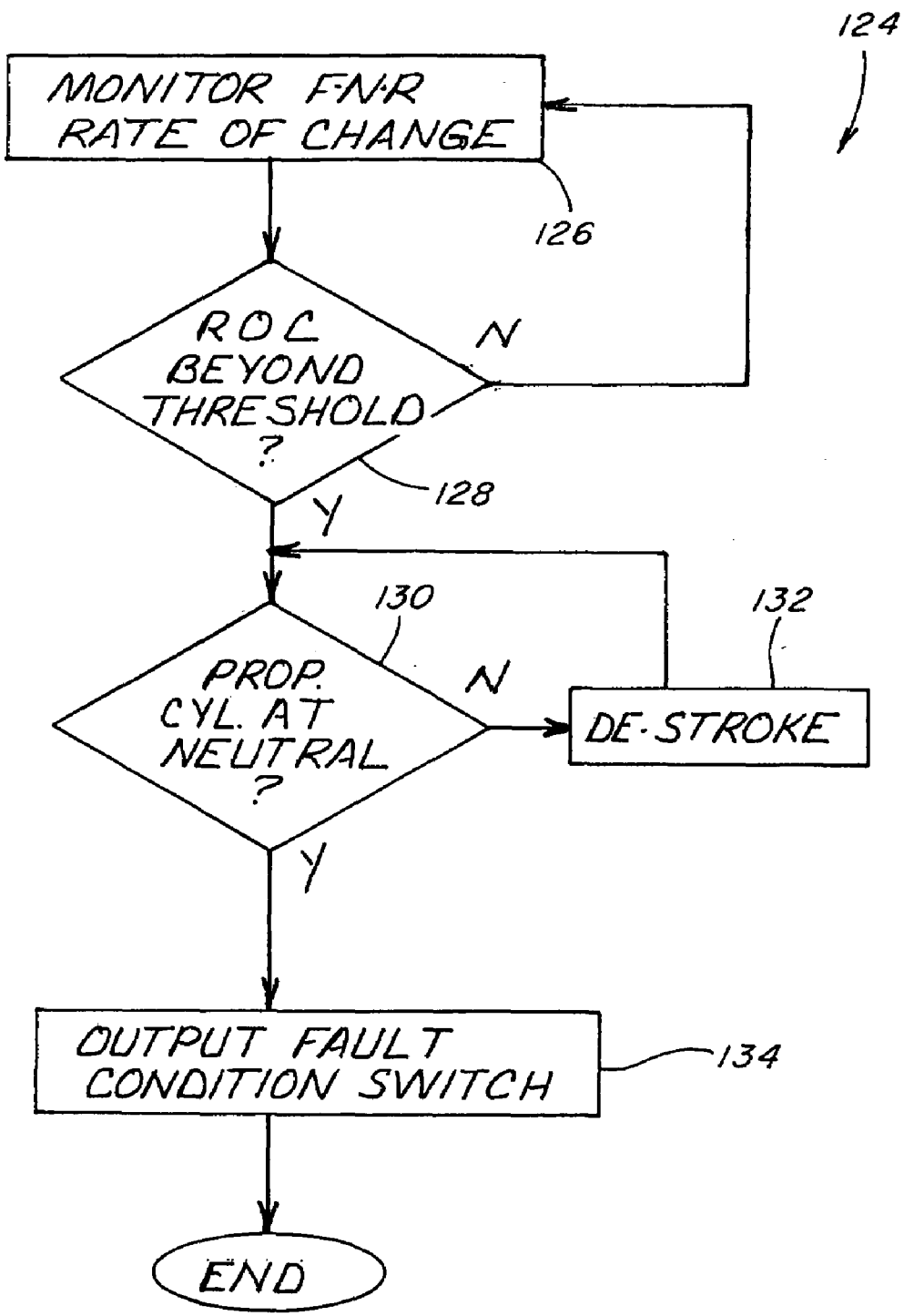
FIG. 10 is a flow diagram illustrating steps including still other aspects of the invention.

FIGS. 8, 9 and 10 illustrate steps of the method of the instant invention for providing failsafe deceleration of a windrower, such as windrower 10, when an operator attempts to take an inappropriate action, here, to engage the park brake with the windrower operating in the high-speed range (FIG. 8); a fault condition is determined in the operation of the neutral switch (FIG. 9); and a fault condition is determined with respect to operation of the FNR lever, namely, rate of change in signals thereof is out of a predetermined range (FIG. 10).

Referring more particularly to flow diagram 96 of FIG. 8, control module 46 monitors the speed range of windrower 10, as denoted at block 98, and park brake status, as denoted at block 100. If the operator attempts to actuate park brake switch 50 (FIG. 2), as determined at decision block 102, control module 46 will determine if the propulsion driveline is in the high-speed range, as denoted at decision block 104. If yes, control module 46 will automatically commence active, controlled de-stroke of pumps 28, as denoted at block 106. Control module 46 will then monitor the position of the propulsion cylinder using the outputs of potentiometers 62, to determine when the propulsion cylinder is at neutral, as denoted at decision block 108. When it is determined that the propulsion cylinder is at neutral, the park brake is applied, as denoted at block 110.

Referring more particularly to flow diagram 112 in FIG. 9, control module 46 monitors errors in signals from operation of neutral switch 44, as denoted at block 114. If, using the fault detection routine set forth above, a fault condition exists, as determined at decision block 116, control module 46 will proceed to determine whether the propulsion cylinder is at neutral, as set forth by decision block 118. If the propulsion cylinder is not at neutral, control module 46 will proceed to actively de-stroke pumps 28, as denoted at block 120, to safely bring the propulsion driveline to neutral. Control module 46 will then output a fault condition signal, as denoted at block 122.

Referring more particularly to flow diagram 124 in FIG. 10, control module 46 monitors errors in the FNR lever rate of change, as denoted at block 126. It is determined that the rate of change is beyond a predetermined threshold, as determined at block 128, control module 46 will determine if the propulsion cylinder is at neutral, as denoted at decision block 130. If not, control module 46 will automatically control the propulsion cylinder to de-stroke pumps 28, as denoted at block 132, until the propulsion driveline is in neutral, and will output a fault condition signal, as denoted at block 134.

Referring also to FIGS. 11-24, lines of code of an actual computer program embodying the above described steps of the method of the invention is disclosed. The notes accompanying the lines of code describe many features of the method of the invention. In the code, the FNR lever is identified as the MFH.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. Apparatus for providing failsafe deceleration of a propulsion driveline of an agricultural windrower, comprising:
   a FNR lever assembly including a FNR lever having a neutral position and movable from the neutral position to at least in both a first direction and in a second direction opposite the first direction, and a sensor disposed and simultaneously operable for sensing positions of the FNR lever as the lever is moved between any position in the first and second directions and outputting signals representative thereof;
   a propulsion cylinder assembly including a propulsion cylinder movable for effecting operation of the propulsion driveline;
   a programmable control module in connection with the sensor of the FNR assembly for receiving the signals outputted thereby, the control module being connected in operative control of the propulsion cylinder and configured operable for outputting control signals thereto for causing movements thereof which track the signals representative of the positions of the FNR lever, the lever configured for movement through a range of positions from the neutral position in the first direction corresponding to a range of forward propulsion commands to the windrower, the control module being programmed and configured for comparing a rate of change of the signals outputted by the sensor configured for sensing positions of the FNR lever to a predetermined threshold value representative of a fault condition, and if the rate of change exceeds the threshold value so as to indicate the presence of a fault condition, then automatically outputting control signals to the propulsion cylinder to effect controlled movement thereof to a neutral position for causing controlled deceleration of the propulsion driveline.

2. The apparatus of claim 1, wherein the propulsion driveline additionally includes a park brake, and wherein the programmable control module is automatically configured after movement of the propulsion cylinder to the neutral position, for engaging the park brake.

3. The apparatus of claim 1, wherein the propulsion cylinder is movable for controlling a stroke of a pump of the propulsion driveline in connection with a drive wheel thereof, and the moving of the propulsion cylinder to the neutral position will de-stroke the pump.

4. The apparatus of claim 1, wherein the propulsion driveline additionally includes a park brake and an operator operable park brake switch for operating the park brake, and wherein the propulsion driveline is operable in a high speed range, and further wherein the programmable control module is programmed for automatically monitoring the operation of the park brake switch, and if the park brake switch is operated for engaging the park brake while the propulsion driveline is operating in the high speed range, then automatically moving the propulsion cylinder to the neutral position before engaging the park brake.

5. The apparatus of claim 1, wherein the FNR lever assembly additionally includes a neutral switch such that movements of FNR lever into the neutral position, and out of the neutral position cause changes in the operating state of switch such that the switch is configured to be in a first operating state when the FNR lever is in the neutral position, and in a second operating state when the FNR lever is in a position other than the neutral position, and the programmable control module is programmed and configured to automatically monitor the operating state of the neutral switch, and compare the operating state to the signals outputted by the sensor operable for sensing positions of the FNR lever, and if the operating state and the sensed position of the FNR lever do not match, then determining that a fault condition exists, and automatically responsively moving the propulsion cylinder to the neutral position.

6. A method for providing failsafe deceleration of a propulsion driveline of an agricultural windrower, comprising steps of:
providing a FNR lever assembly including a FNR lever having a neutral position and movable from the neutral position in both a first direction and in a second direction opposite the first direction, and a sensor disposed and simultaneously operable for sensing positions of the FNR lever as the lever is moved between any position in the first and second directions and outputting signals representative thereof;
providing a propulsion cylinder assembly including a propulsion cylinder movable for effecting operation of the propulsion driveline;
providing a programmable control module in connection with the sensor of the FNR assembly for receiving the signals outputted thereby, the control module being connected and configured to control the propulsion cylinder and for outputting control signals thereto for causing movements thereof which track the signals representative of the positions of the FNR lever the lever configured for movement through a range of positions from the neutral position in the first direction for providing a range of forward propulsion commands to the windrower; and wherein
the control module is programmed to automatically:
compare a rate of change of the signals outputted by the sensor configured for sensing positions of the FNR lever to a predetermined threshold value representative of a fault condition, and if the rate of change exceeds the threshold value so as to indicate the presence of a fault condition, then
output control signals to the propulsion cylinder to effect controlled movement thereof to a neutral position for causing controlled deceleration of the propulsion driveline.

7. The method of claim 6, wherein the propulsion driveline additionally includes a park brake, and wherein the programmable control module is automatically operable after movement of the propulsion cylinder to the neutral position for engaging the park brake.

8. The method of claim 6, wherein the propulsion cylinder is movable for controlling a stroke of a pump of the propulsion driveline in connection with a drive wheel thereof, and the moving of the propulsion cylinder to the neutral position will de-stroke the pump.

9. The method of claim 6, comprising additional steps of:
providing a park brake and an operator operable park brake switch for operating the park brake, and wherein the propulsion driveline is operable in a high speed range; and
wherein the programmable control module will automatically monitor the operation of the park brake switch, and if the park brake switch is operated for engaging the park brake while the propulsion driveline is operating in the high speed range, then:
automatically move the propulsion cylinder to the neutral position before engaging the park brake.

10. The method of claim 6, wherein the FNR lever assembly additionally includes a neutral switch configured to be in a first operating state when the FNR lever is in the neutral position, and in a second operating state when the FNR lever is in a position other than the neutral position, and the programmable control module is programmed to perform steps of:
automatically monitoring through the control module the operating state of the neutral switch, and the control module configured for comparing the operating state to the signals outputted by the sensor operable for sensing the and positions of the FNR lever, and if the operating state and the sensed position of the FNR lever do not match, then
determine that a fault condition exists, and upon determination of a fault the controller is configured to automatically responsively move the propulsion cylinder to the neutral position.

11. A method for providing failsafe deceleration of a propulsion driveline of an agricultural windrower, comprising steps of:
providing a FNR lever assembly including a FNR lever having a neutral position and movable from the neutral position in both a first direction and in a second direction opposite the first direction, and a sensor disposed and simultaneously operable for sensing positions of the FNR lever as the lever is moved between any position in the first and second directions and outputting signals representative thereof; and wherein the FNR lever assembly additionally includes a neutral switch configured such that movements of FNR lever into the neutral position, and out of the neutral position cause changes in the operating state of switch such that the switch is in a first operating state when the FNR lever is in the neutral position, and in a second operating state when the FNR lever is in a position other than the neutral position;
providing a propulsion cylinder assembly including a propulsion cylinder movable for effecting operation of the propulsion driveline;
providing a programmable control module in connection with the sensor of the FNR assembly for receiving the signals outputted thereby, the control module being connected in operative control of the propulsion cylinder and operable for outputting control signals thereto for causing movements thereof which track the signals representative of the positions of the FNR lever; the lever configured for movement through a range of positions from the neutral position in the first direction corresponding to a range of forward propulsion commands to the windrower and wherein the control module is configured to automatically monitor the operating state of the neutral switch, and compare the operating state to the signals outputted by the sensor operable for sensing the positions of the FNR lever, and if the operating state and the sensed position of the FNR lever do not match, then determine that a fault condition exists, and upon determination of a fault the controller is configured to automatically responsively move the propulsion cylinder to the neutral position.

12. A method for providing failsafe deceleration of a propulsion driveline of an agricultural windrower, comprising steps of:

providing a FNR lever assembly including a FNR lever having a neutral position and movable from the neutral position, in both a first direction and in a second direction opposite the first direction, and a sensor disposed and simultaneously operable for sensing positions of the FNR lever as the lever is moved between any position in the first and second directions and outputting signals representative thereof; the lever configured for movement through a range of positions from the neutral position in the first direction for providing a range of forward propulsion commands to the windrower providing a park brake and an operator operable park brake switch for operating the park brake, and wherein the propulsion driveline is operable in a high speed range; and wherein the programmable control module is configured to monitor the operation of the park brake switch, and if the park brake switch is operated for engaging the park brake while the propulsion driveline is operating in the high speed range, then:

signaling from the control module to move the propulsion cylinder to the neutral position before engaging the park brake.

* * * * *